Figure 1:
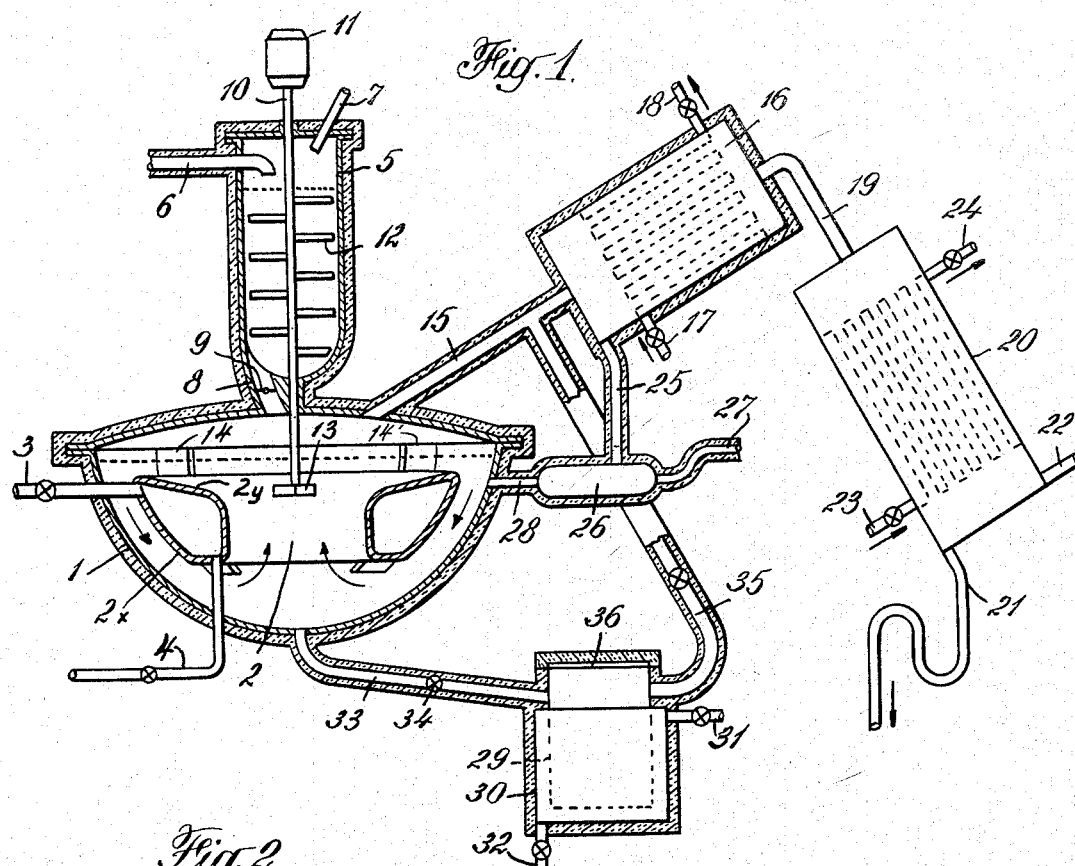

Feb. 1, 1944.  F. PORTER  2,340,490

DEHYDRATION OF MALEIC ACID

Filed March 27, 1939

INVENTOR
*Frank Porter*
BY
*George B. Campbell*
ATTORNEY

Patented Feb. 1, 1944

2,340,490

UNITED STATES PATENT OFFICE 2,340,490

DEHYDRATION OF MALEIC ACID

Frank Porter, Syracuse, N. Y., assignor to The Solvay Process Company, New York, N. Y., a corporation of New York Application March 27, 1939, Serial No. 264,407

10 Claims. (Cl. 260—342.6)

This invention relates to the conversion of maleic acid to maleic acid anhydride, more frequently designated simply maleic anhydride, and is particularly concerned with a novel method for effecting the decomposition of maleic acid to produce a vapor mixture comprising maleic anhydride and water vapor with a maximum yield of the maleic anhydride and a minimum conversion of the maleic acid to fumaric acid and other by-products.

It has been proposed to distill crude maleic acid, containing benzoquinone, with an organic solvent for the benzoquinone, such as xylol, in which the maleic acid is difficultly soluble, either by passing vapors of the solvent through the maleic acid or by distilling a mixture of the two. The vapors of the solvent in this process serve as a carrier medium for water and maleic anhydride vapors and provide a solution of impurities from which maleic acid condensate may be recovered by filtration.

It also has been proposed to heat maleic acid in a suitable vessel until the maleic acid attains a mushy consistency and then to distill the mush at low pressure, crude acid being added progressively to replenish that which is distilled. Such a process is open to the objections that first it requires accurate control of temperature and pressure conditions in order to maintain the desired mushy consistency, and second it leads to the formation of undeisrably high proportions of fumaric acid.

It also has been proposed to decompose maleic acid by distributing the acid on a surface sufficiently hot to effect substantially instantaneous decomposition. When a solid heating surface is used with this process, a more or less tarry distillation residue is formed which must be scraped promptly from the surface in order to maintain the efficiency of conversion to maleic anhydride. If distillation residue is allowed to accumulate, the proportion of maleic acid converted to fumaric acid is correspondingly increased. Consequently the process is confronted with the problem of constructing apparatus which will effect satisfactory removal of residue. The acid is heated directly by the hot surface and the hot acid, which is highly corrosive, causes objectionably rapid corrosion of the heating surface.

It is an object of the present invention to provide a method for decomposing maleic acid to maleic anhydride without formation of seriously objectionable proportions of fumaric acid, tar, or other undesired decomposition or polymerization products.

It is a further object of the present invention to provide a method for decomposing maleic acid to maleic anhydride without severe corrosion of apparatus.

A yet further object is to avoid scraping the heating surface and thereby to simplify the apparatus required for conducting the process.

Other objects of the invention will appear from the following description thereof.

Whereas the conversion of maleic acid to fumaric acid is generally represented

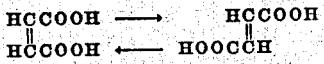

and is thus indicated to be a monomolecular reaction, I have found that the reaction is of higher order than monomolecular. I have found further that by taking advantage of this discovery I am able to convert maleic acid to maleic anhydride efficiently with the production of only very small proportions of fumaric acid and other by-products without restricting myself to a limited range of temperatures or pressures as previously required in effecting the conversion. Thus I have found that upon dilution of maleic acid the amount of fumaric acid formed is not reduced proportionately to the concentration as might be expected but is reduced to a surprisingly greater degree, for instance, while it might be supposed that the amount of fumaric acid formed in a 10% maleic acid solution would be one-tenth that formed in a like quantity of 100% maleic acid in a given time, actually the amount of fumaric acid formed in the 10% maleic acid drops to a value more closely approximating one one-hundredth the amount formed in the 100% maleic acid under the same temperature and pressure conditions.

Hence by effecting the decomposition of maleic acid to maleic anhydride with the maleic acid in relatively dilute condition in a suitable liquid medium, the concomitant conversion of maleic acid to fumaric acid may be reduced. In order to secure low conversion of maleic acid to fumaric acid, the concentration of maleic acid should be maintained at not exceeding, and preferably considerably under, 10% of the total diluent-liquid maleic acid mixture.

In accordance with the process of my invention maleic acid is decomposed to maleic anhydride by introducing the maleic acid gradually into a heated body of diluent liquid in which the maleic acid concentration is kept at not exceeding 10%. Since high local concentrations of maleic acid lead to increased fumaric acid formation, adequate mixing facilities to insure prompt distribution of the acid in the diluent should be provided. Low local concentrations may be further insured by introducing the maleic acid in the form of a mixture thereof with diluent, mixing being effected at a temperature at which fumaric acid formation is relatively slow, and employing as the diluent a solvent for maleic acid which is readily miscible therewith at the temperature of dehydration.

The provision of a carrier vapor or the use of subatmospheric pressure is not a necessary adjunct of the process although either or both may be employed in connection therewith. Since the conversion of maleic acid to maleic anhydride is exceedingly slow at low temperatures, even at reduced pressures, it is desirable to employ a temperature above 100° C. (373° absolute).

Diluent media suitable for the purposes of the present invention are materials which (a) are chemically inert to maleic acid and anhydride, (b) are thermally stable at operating temperature and pressure, (c) have a boiling point or boiling range sufficiently different from that of maleic anhydride (preferably above the boiling point of maleic anhydride) to permit ready separation by distillation, and (d) have a melting point below operating temperature (preferably below 60° C.). Materials which are normally liquids make the most satisfactory heating media since they minimize the possibility of "freezing" in the system.

As diluent media I may employ hydrocarbons, such as methyl-naphthalenes, diphenyl, refined petroleum fractions of high boiling range, say above 240° C.; ethers, such as diphenyl oxide; esters, such as methyl phthalate and butyl succinate; organic acids, such as benzoic acid; acid anhydrides, such as tetrachlorphthalic acid anhydride, maleic acid anhydride, and succinic acid anhydride; and fused salt mixtures, for example mixtures of sodium maleate and sodium hydrogen sulfate which are liquid at temperatures on the order of 255° C.

I have found organic dicarboxylic acid anhydrides which do not contain substituents reactive under the conditions outlined to be highly satisfactory. Maleic anhydride itself is most advantageous, since this anhydride does not introduce foreign materials into the anhydride product. Various mixtures of maleic and phthalic anhydrides also may be employed; the proportions being controlled by the temperature of the mixture.

An important feature of the preferred embodiment of my invention is the feeding of maleic acid to the heating and dehydrating zone in admixture with molten maleic anhydride at a temperature substantially below the dehydration temperature of the maleic acid. By use of a ratio of anhydride to acid between the limits of 1:3 and 3:1, a fluid slurry is obtained which may be introduced into contact with the heating medium without the difficulties attending the handling of solid maleic acid alone. The slurry flows freely and disperses readily in the heating medium. The expression "mobile slurry" employed in a number of the appended claims designates a slurry having these characteristics. The pre-mixing of anhydride with the acid aids the distribution of the latter and reduces the local concentration of the acid in the heating zone at or near the acid inlet.

The process of the present invention may be conducted at atmospheric pressure or at higher or lower pressure. Pressures substantially higher than atmospheric appear to have no advantage over atmospheric pressure and are subject to the disadvantage that for corresponding rates of decomposition and vaporization higher temperatures are required and fumaric acid formation and tar formation are increased. Small pressure changes do not, however, appreciably affect the yield. Pressures lower than atmospheric accelerate the decomposition and vaporization but on the other hand increase the proportion of heating medium vaporized and consequently decrease slightly the heat efficiency when a liquid medium of relatively high vapor pressure at the temperature of decomposition is employed.

In the absence of inert carrier vapors or gases in the dehydrating zone, I have found it desirable to correlate the temperature and pressure on the maleic acid so that the total pressure is not more than expressed by the equation $$P = \text{antilog}_{10}\left(8.2 - \frac{2350}{T}\right)$$

where $P$ is the total pressure expressed in mm. of mercury and $T$ is the absolute temperature in degrees Kelvin.

When maleic anhydride is employed as the diluent liquid, the preferred pressure in the dehydrator is in the neighborhood of 0.6 $P$. For example, at about 188° C. (461° K.), $P = \text{antilog}_{10} 3.10 = 1260$ mm. of mercury and the preferred pressure is about 760 mm. mercury. Thus pressures in the neighborhood of atmospheric are suitable for temperatures in the range 180 to 195° C. Then again at about 140° C. (413° K.) $P = \text{antilog}_{10} 2.50 = 316$ mm. mercury and the preferred pressure is about 190 mm. mercury.

Best results are obtained with my process when adequate agitation is provided to assure rapid diffusion of the added maleic acid without local reduction of temperature of the heating medium for any appreciable period of time. The rate of addition of maleic acid is therefore dependent upon the efficiency of agitation, the rate of heat input into the heating medium, the temperature of the maleic acid before introduction, and the proportion, if any, of diluent, for example maleic anhydride, previously mixed with the maleic acid.

The maleic anhydride product may be recovered from the vapors produced in accordance with the present invention in any suitable and convenient manner such as by fractional condensation or by absorption. When a volatile liquid is employed as the heating medium, the vapors thereof may be condensed by fractional condensation ahead of or beyond the product maleic anhydride or simultaneously with the maleic anhydride. The disadvantage of the last-mentioned procedure, when a heating medium other than maleic anhydride itself is employed, is that a subsequent separation of the heating medium and maleic anhydride is required. This disadvantage is avoided when maleic anhydride is employed as the heating medium; it is merely necessary then to return condensed maleic anhydride to the decomposing zone. This may be accomplished either by returning the hot maleic anhydride condensate directly to the decomposing zone or by mixing the condensate with maleic acid to be introduced into the decomposing zone and supplying to the zone a mixture containing a proportion of the anhydride sufficient to replace that vaporized. In the preferred process a combination of these methods is employed. Sufficient maleic anhydride is mixed with the maleic acid to provide a mobile slurry and the balance of the maleic anhydride required to maintain a constantly adequate supply in the decomposing zone is supplied directly from the condenser.

The anhydride which is mixed with the maleic acid to form a slurry may be mixed in the state it is obtained from the condenser but preferably it is first cooled to about 60° C.

Figure 2:
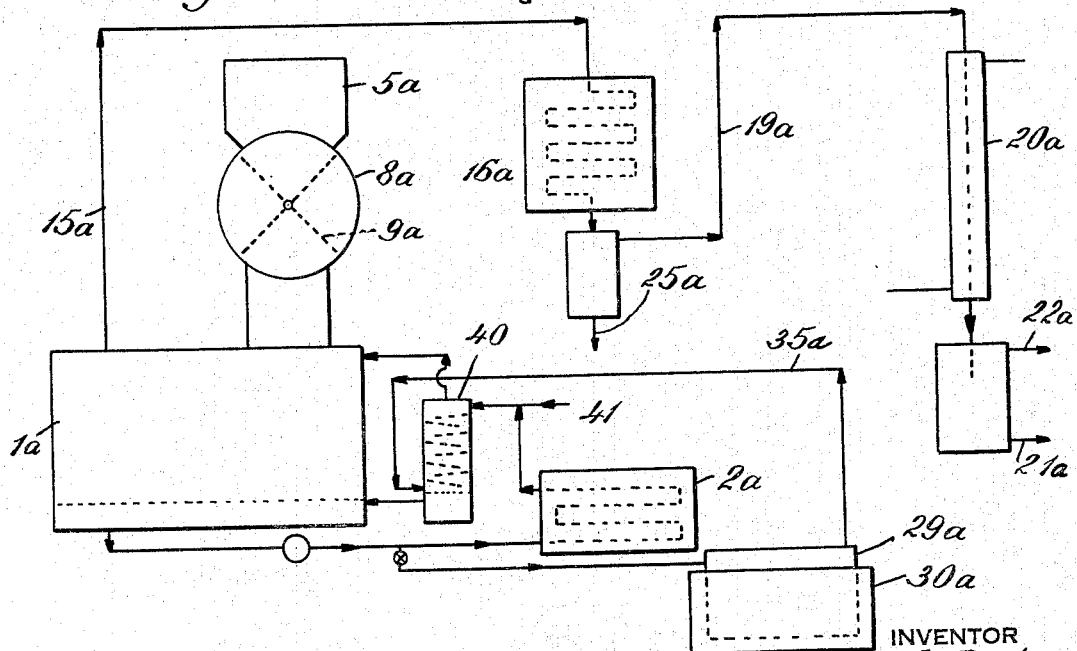

The process of my invention will be more clearly understood from the following description of specific embodiments thereof, apparatus for which is illustrated diagrammatically in the drawing, wherein, Fig. 1 illustrates one arrangement of apparatus adapted particularly for carrying out the process in its preferred form using maleic anhydride as the heating medium and introducing the maleic acid as a slurry in molten maleic anhydride; and Fig. 2 is an alternative form of apparatus generally similar to that shown in Fig. 1 but employing an external tubular heater for heating the maleic anhydride and a pump for circulation thereof in place of the agitator and internal heating element shown in Fig. 1.

With particular reference to Fig. 1, the numeral 1 designates a decomposition vessel provided with a heating element 2 which may have an inlet 3 for heating fluid and an outlet 4 therefor. Heating element 2 has been illustrated as a hollow annulus of more or less rounded triangular contour conforming on the outside at 2x with the shape of vessel 1. The broad top surface 2y is arranged slightly below the normal liquid level and inclined slightly upwardly from the center.

The heating element preferably should be constructed of or coated with a corrosion resistant material. A high-chromium iron or steel, for instance an 18% chromium, 8% nickel, 3% molybdenum iron may be employed. The use of corrosion resistant material is preferable, though not so important, wherever else maleic acid is handled in the system. The upper surface 2y especially is subject to the corrosive influence of the maleic acid and may be thicker than other surfaces of the heating element especially if the heating fluid introduced at 3 is at a particularly high temperature. This surface as illustrated provides an annular table over which the anhydride-acid mixture flows as a relatively shallow body. In this way vaporization is facilitated and is completed to a considerable extent by heat imparted to the anhydride-acid mixture as it flows over surface 2y. By extending heating surface 2y laterally, a larger proportion of the heating may be effected thereby. Corrosion is accelerated by high temperatures and it is therefore desirable to avoid high wall temperatures where maleic acid is present. An alternative method of keeping the surface 2y at a relatively low temperature is to reverse the flow of heating fluid and circulate it from 4 to 3, providing, if desired, baffles or partitions, a spiral partition, for instance, to control the flow so that the heating fluid in contact with the wall 2y will have been partly cooled by previous heat exchange in the lower portion of the heating element.

The temperature of the heating fluid within heating element 2 may be varied within wide limits from only slightly above the temperature of the molten maleic anhydride bath, say between 150° and 200° C. (depending upon the pressure in the dehydrator) up to temperatures of 400° C. or higher. High temperatures permit use of relatively small apparatus, but, on the other hand, require highly efficient agitation and circulation. From the standpoint of corrosion it is preferable to use a large heat exchange area rather than a high temperature of the heating fluid within element 2.

Directly above the vessel 1 a mixing hopper 5, provided with a molten maleic anhydride inlet 6 and a crystalline maleic acid inlet 7, is arranged with an outlet 8, controlled by a suitable throttle valve 9, leading into vessel 1. A shaft 10, driven by motor 11, carries agitator blades 12 within hopper 5 and an agitator and propeller 13 within vessel 1, the agitator and propeller 13 is located near but below the normal liquid level therein.

The agitator and propeller 13 may be a centrifugal propeller of very low pitch operated at high speed to provide gradual propulsion of liquid upward at the center of the vessel 1 and at the same time to effect violent mixing of the material introduced from hopper 5 with the liquid in vessel 1. Any suitable propeller and agitator may be employed; for instance, a small straight rod or bar or a ridged disc may be used, or a combination of a small propeller with other types of agitating device may be used. Separately controlled agitators for mixing the acid and hot liquids and for circulating the hot liquid may be employed so that circulation and agitation may be independently controlled. Whatever construction is employed, two purposes should be accomplished, (1) quick and complete dinspersion of the slurry in the liquid in vessel 1, and (2) circulation of the liquid in vessel 1 in efficient heat exchange relation with the heating element 2 to maintain the liquid constantly at the desired operating temperature.

The vessel 1 may contain vanes 14, 14', etc. to prevent rotation of the entire mass of liquid therein. The vanes 14, 14', etc. may be mounted upon the walls of vessel 1 or upon, or may support the heating element 2. In the latter cases they may serve not only to prevent rotation of the liquid mass but also to increase the heating surface available.

A vapor outlet 15 leads from vessel 1 to a hot condenser 16. This hot condenser is provided to effect fractional condensation of maleic anhydride while retaining water in vapor phase. Cooling in condenser 16 may be accomplished suitably by a liquid boiling at constant temperature, for instance water maintained at sufficient pressure to boil around 110° C. A cooling liquid inlet 17 and liquid or vapor outlet 18 are shown for this purpose.

From condenser 16, a vapor line 19 passes to a final cooler 20 for recovery of residual maleic anhydride. Since cooling to as low a temperature as feasible is desirable for recovering the maleic anhydride completely, the residual anhydride is condensed in the presence of water and is recovered in the form of a maleic acid solution which may be withdrawn through a liquid outlet 21. Condenser 20 is provided with a vent 22 for uncondensed gas and vapor and with a cooling liquid inlet 23 and outlet 24.

From condenser 16 a condensate outlet 25 leads back via a surge pipe 26 to vessel 1. An overflow outlet 27 is arranged at about the desired normal level in vessel 1 so that this level is maintained constant during the decomposition process, only excess being drawn off via outlet 27. The pipe 26 has a restriction 28 which prevents surges of liquid in vessel 1 from causing flow of liquid from vessel 1 to outlet 27, and also prevents a back flow of air into vessel 1 as a result of such surges.

A vessel 29, having a heating jacket 30 with vapor inlet 31 and liquid outlet 32, is connected to vessel 1 by a liquid conduit 33, flow through which is controlled by a valve 34, and is connected by vapor conduit 35 to vapor line 15. Vessel 29 has a removable lid 36.

Suitable lagging or steam jacketing is provided over those parts of the apparatus maintained at elevated temperatures.

For decomposing maleic acid at atmospheric pressures the above apparatus may be operated as follows: Molten maleic anhydride is introduced at 6 at a temperature of about 60° C. and allowed to flow through conduit 8 until vessel 1 is filled to the normal operating level. Agitators 12 and 13 are put in operation, the direction of rotation being such as to cause circulation of maleic anhydride up through the center of the heating element 2, out centrifugally over the surface 2y and down peripherally along the outside wall 2x of this heating element. High pressure steam or other heating medium at a high temperature, say 250° C., is introduced at inlet 3 to heat the maleic anhydride and maintain it at a temperature near its boiling point, for instance between 185° and 195° C.

Hot water is introduced at 17 into the cooling fluid side of condenser 16 and the pressure controls are adjusted to provide a boiling point of about 110° C. A cooling fluid, such as cold water, is introduced at 23 into the cooling fluid side of condenser 20 and is withdrawn at 24.

In starting up, it is desirable to operate with maleic anhydride for a few minutes until the temperature equilibrium of the system is established, so that condenser 16 and the walls of the apparatus will be heated to normal operating temperatures.

Finely divided crystalline maleic acid is then introduced through inlet 7 in about equal weight proportion with the maleic anhydride flowing in at 6. The slurry entering vessel 1 at 8 is dispersed instantly in the hot anhydride by the mixer 13. Part of the acid is immediately decomposed (and vaporized) as it flows outwardly toward and before it comes in contact with the heating element and most of the remainder is decomposed as it passes over surface 2y. The remaining liquid anhydride, containing less than 1% of maleic acid, passes down between wall 2x and the wall of vessel 1 and back up through the center of the heating element for reuse.

The rate of feeding maleic acid slurry may be controlled by throttle valve 9 and inlets 6 and 7 to introduce on the order of 100 grams of maleic acid slurry per hour per 100 grams of maleic anhydride in vessel 1. However, much higher rates may be employed, depending upon the degree of agitation and the capacity of the heating element.

As previously pointed out, the maximum rate of flow for any given apparatus may be determined by an observation of the temperature of the liquid or vapor in vessel 1. Preferably the rate of feed should be controlled to maintain operating temperatures between 185° and 195° C. with only a few degrees difference between the anhydride at its hottest and "coolest" points. The average sojourn of each increment of maleic acid within the decomposition chamber may be about one minute. Although higher temperatures may be used advantageously with other liquid heating media, such as phthalic anhydride, the high vapor pressure of maleic anhydride at temperatures above 195° C. utilizes an inordinately large proportion of the heat supply for maleic anhydride vaporization rather than for the primary conversion of maleic acid to maleic anhydride and also imposes an undesirably heavy load on condenser 16.

Vapors of maleic anhydride and water pass off from vessel 1 through vapor line 15 to condenser 16 where they are cooled to about 110° C. by the boiling water therein and maleic anhydride is thus condensed and returned via pipes 25 and 26 to vessel 1. The excess of maleic anhydride over that required for maintaining a constant level in vessel 1 flows out at 27.

Operating at atmospheric pressure and recovering a condensate at 110° C., maleic anhydride corresponding to about 90% of the maleic acid feed, plus maleic anhydride vaporized, is recovered in the hot condenser 16. This condensate will contain only a very small percentage of water, present as maleic acid dissolved in the maleic anhydride. The crude maleic anhydride product overflowing at 27 may be purified by heating it in an ordinary iron or steel still to about 180° C., thus driving off any water present, maintaining this temperature for about three hours, thus polymerizing impurities, and finally distilling off in vacuo the maleic anhydride from polymerization products, fumaric acid, and other less volatile impurities. Corrosion-resistant distillation equipment is advantageous, especially where a product of high purity is desired. For promoting the polymerization, polymerization catalysts may be employed.

As previously indicated, small quantities of by-products are formed. These may amount to anywhere from a fraction of a percent up to 2% or 3% or more. Fumaric acid, although it has a boiling point substantially above that of maleic anhydride, has a sufficient vapor pressure so that small quantities pass off with the maleic anhydride. By avoiding cooling of the vapor stream prior to contact with the cooling medium within condenser 16, condensation of fumaric acid along the walls of the conduit and eventual stoppages by this material, which has a solidification point of about 287° C., may be avoided. The relatively large quantities of maleic anhydride condensed in condenser 16 serve to wash from the condenser surfaces the fumaric acid condensed thereon. The use of a boiling liquid bath as cooling medium in condenser 16 inhibits fractional condensation of fumaric acid and the counterflow of condensed anhydride eliminates the possibility of eventually clogging the inlet ends of the condenser tubes by fumaric acid.

In order to remove tarry materials and avoid gradual accumulation thereof in the decomposition vessel 1, a secondary heating chamber 29 is provided. A small proportion of the liquid in vessel 1 is gradually withdrawn through line 33 and distilled to dryness in vessel 29. Vapors from this distillation are returned via line 35 to vapor line 15 as indicated in the drawing. This distillation may be conducted substantially continuously or batchwise.

The continuous operation of "still" 29 provides a more uniform load on condenser 16 and therefore is advantageous when the system illustrated is employed.

If batch operation of the still 29 is employed, vapor line 35 may lead into the central portion of vessel 1 below the liquid level therein so that the vapors from still 29 can supply heat to the liquid in vessel 1, thus reducing the load on heating element 2 during this distillation period. Whether the refining of the maleic anhydride is conducted in batchwise or continuous fashion, the vessel 29 should be cleaned out periodically to eliminate the solid deposits therein. These deposits normally consist of tarry material and some fumaric acid.

In place of the simple vessel 29, which has been shown with a removable top 36 for cleaning, a continuously operating tar still may be employed and the tarry distillation residue removed as liquid.

If the liquid in vessel 1 is maintained at temperatures slightly lower than those indicated, maleic acid will continue to be dehydrated but the amount of anhydride retained in liquid phase will be larger. Hence instead of returning anhydride through pipe 26, it will be drawn off from the vessel through this pipe. To the extent that the product is drawn off from vessel 1, it will contain tarry impurities. If sufficient of the product is drawn off from vessel 1, the unit 29 may be dispensed with entirely and tar removal taken care of by distillation of the final product.

Vapors leaving condenser 16 at a temperature around 110° C. contain maleic anhydride and water vapor together with any gases formed as a result of destructive thermal decomposition during the process. This mixture passes down through cooler 20 where maleic anhydride and water vapor thus condensed form an aqueous maleic acid solution, which is withdrawn through pipe 21 by which it may be sent to a suitable evaporator for separating the maleic acid from water. If desired, instead of employing a separate evaporator for recovering solid maleic acid, the condenser 20 may be replaced by a fractionation system and the maleic acid may be recovered directly as an aqueous slurry, from which the solid acid may be separated by decantation or filtration, excess water vapor being expelled from the system in vapor phase. Where the maleic acid being dehydrated is obtained initially as an aqueous solution, a separate fractionating system in place of or in addition to cooler 20 is unnecessary since the acid solution recovered from cooler 20 may be worked up with the main body of maleic acid solution.

Fig. 2 shows an arrangement generally similar to Fig. 1 with corresponding parts designated by corresponding numerals with the additional letter "a". Decomposition vessel 1a is provided with an external heater 2a which in this case is a tubular heater connected with vessel 1a in such a manner that liquid is withdrawn from one end of the vessel, passed through the heater, and returned to the other end thereof. A conventional tubular heater heated directly by combustion gases may be employed. A hopper 5a is arranged above vessel 1a and connected thereto by conduit 8a controlled by a feeder valve 9a, for instance a star valve. A vapor line 15a leads to hot condenser 16a from which vapor line 19a passes to condenser 20a. Crude maleic anhydride is withdrawn at 25a and aqueous maleic acid solution is withdrawn at 21a. The anhydride bath is refined by distillation in a residue pot or still 29a, heated by steam jacket 30a. Vapors from residue pot 29a pass up through vapor line 35a to a small, direct contact, vapor-liquid tower 40 where they may give up their heat to anhydride entering the decomposition vessel 1a. Make-up anhydride may be added at inlet 41.

The operation of the apparatus of Fig. 2 is essentially similar to that of Fig. 1. The anhydride bath is circulated through heater 2a until a temperature between 185° and 195° C. for maleic anhydride or between 200° and 280° C. for phthalic, or phthalic-maleic mixtures, is obtained and feeder valve 9a is then opened to introduce solid maleic acid crystals gradually into the anhydride bath in vessel 1a, the rate of feeding being such that the temperature at the liquid outlet end of the vessel 1a does not fall below 160° C. Vapors are withdrawn through vapor line 15a and fractionally condensed in condenser 16a to separate crude maleic anhydride which is withdrawn at 25a and sent to a still for fractional distillation to separate fumaric acid and maleic acid and any other impurities which it many contain. Uncondensed vapors are then withdrawn to cold condenser 20a where they are further cooled to separate maleic acid solution which is then passed to an evaporator for separation of solid crystalline maleic acid. During the process a portion of the anhydride is withdrawn to residue pot 29a and distilled to separate tarry materials and the purified anhydride in vapor phase is returned to tower 40 where it meets and gives up a substantial proportion of its heat of vaporization to ingoing anhydride from heater 2a and make-up anhydride introduced at the top of this tower. Any uncondensed vapors leaving the top of tower 40 may be introduced into vessel 1a or vapor line 15a.

In the processes of the above examples the condensation of maleic anhydride may be effected at reduced pressure, for instance a pressure below ⅓ atmosphere absolute, while effecting the distillation at atmospheric pressure. For this purpose a reducing valve may be inserted in the vapor lines 15 and 15a. In such event, of course, a barometric leg or pump must be provided on lines 25 and 25a. Vacuum pumps on lines 19 and 19a may be provided for creating the desired reduced pressure in condensers 16 and 16a, while permitting operation of condensers 20 and 20a under atmospheric pressure, or the vacuum pump may be placed on lines 22 and 22a to permit both condensation steps to be conducted under vacuum. This latter method reduces the work required of the vacuum pump but increases the difficulty of securing complete condensation of maleic acid.

An alternative method of decomposing maleic acid into maleic anhydride and water vapor by the process of the present invention comprises the introduction of the maleic acid into a short fractionating column, for instance a column having two or three plates. The acid may be fed to the top plate composed of corrosion resistant metal. In this case the liquid maleic anhydride forming the hot diluent is heated by maleic anhydride vapor bubbling up therethrough. The maleic anhydride is heated at the bottom of the column in a manner customary in a column still and the resulting vapors pass upwardly to heat the maleic anhydride in the upper plates. Maleic anhydride remaining from the maleic acid dehydration passes down the column subsequently to serve as heating medium for further additions of maleic acid. In such an apparatus the top plate to which the acid is fed may contain a somewhat greater depth of liquid than usual for fractionating columns in order to facilitate mixing of maleic acid with the anhydride bath.

In conducting my process I have secured decomposition of maleic acid to maleic anhydride with only nominal proportions of by-products.

Thus, using a maleic anhydride bath maintained at a temperature of 180° C. and continuously feeding maleic acid crystals at the rate of 480 grams of maleic acid per 100 grams maleic anhydride bath per hour, I have obtained only 2.2% of fumaric acid and 0.3% of tar based on maleic acid.

Using a maleic acid, maleic anhydride slurry containing 90 grams maleic anhydride per 100 grams maleic acid, in place of the maleic acid crystals, and a temperature of 190° C. with a rate of feed of about 400 grams maleic acid per 100 grams of maleic anhydride bath per hour, I obtained only 2.3% of fumaric acid and only 0.15% of tar.

Reducing the rate of feed from about 400 grams to 36 grams per 100 grams per hour increased the fumaric acid and tar formation to 3.3% and 0.2%, respectively.

Using a phthalic anhydride bath at a temperature of 250° C. and a rate of feed of 500 grams maleic acid (crystals) per 100 grams per hour, I obtained only 0.4% of fumaric acid and 1.3% of tar.

It should be noted that in employing phthalic anhydride as the heating medium for maleic acid, the composition of the bath is altered by the temperature at which it is maintained. If a low temperature is employed, the phthalic anhydride will dissolve maleic anhydride until a very considerable proportion of maleic anhydride is present in the bath. Thus at temperatures in the neighborhood of 200° C. maleic anhydride will dissolve in the phthalic anhydride until an approximately 50:50 composition is obtained. If on the other hand a temperature of 240° C. is maintained, the bath will consist of nearly 90% phthalic anhydride and at 260° C. 95% phthalic anhydride.

The process of the present invention is applicable not only to the dehydration of maleic acid alone but to the dehydration of maleic acid-phthalic acid mixtures, for example mixtures such as result from evaporation of water from the maleic acid effluent of the process of United States Patent 2,071,357. When a mixture of maleic acid and phthalic acid is used, the phthalic acid is dehydrated along with the maleic acid. If large proportions of phthalic acid are present, it may be necessary to withdraw phthalic anhydride from the decomposing vessel instead of supplying additional phthalic anhydride thereto. This procedure is similar to the procedure previously described wherein make-up maleic anhydride is added in admixture with the maleic acid in sufficient quantities to supply all of the losses of maleic anhydride by vaporization.

I claim:

1. The method of converting maleic acid to maleic anhydride, which comprises feeding maleic acid gradually to a body of maleic anhydride while maintaining the maleic anhydride at a temperature of at least 180° C., the rate of feeding being correlated with the rate of decomposition thereof so that there is substantially little or no accumulation of undecomposed maleic acid, the dilution of the maleic acid by the maleic anhydride serving to minimize the formation of fumaric acid.

2. The method of claim 1 and in which the conversion takes place at atmospheric pressure.

3. The method of claim 1 and in which the maleic acid is fed in the form of a fluid mixture of maleic acid and maleic anhydride.

4. In a method of converting maleic acid to maleic anhydride with a minimum conversion to fumaric acid, the improvement comprising feeding maleic acid gradually to a body of inert organic carboxylic acid anhydride liquid while maintaining the liquid body at a temperature of at least 180° C., the rate of feeding the maleic acid being correlated with the rate of decomposition thereof to obtain immediate conversion into maleic anhydride and being so correlated that there is substantially little or no accumulation of undecomposed maleic acid.

5. The method of claim 4 and in which the maleic acid is fed in the form of a mobile slurry of maleic acid in an inert non-aqueous liquid miscible therewith.

6. The method of claim 4 and in which the maleic acid is fed in the form of a mobile slurry consisting of maleic acid and maleic anhydride in a ratio between 1:3 and 3:1.

7. The method of preparing from maleic acid a maleic anhydride water vapor mixture suitable for fractional condensation and recovery of maleic anhydride, which comprises gradually feeding maleic acid into a substantially constant volume of an inert diluent liquid comprising not less than about 90% of a mixture of maleic anhydride and at least one dicarboxylic acid anhydride having a boiling temperature substantially above that of maleic anhydride, maintained at a temperature between 100° and 400° C. but below the boiling point of the higher boiling dicarboxylic acid anhydride and at a pressure such that water escapes as vapor at substantially its rate of formation, and maintaining throughout substantially the entire conversion a concentration of maleic acid in the diluent liquid not above 10%.

8. The method of preparing from maleic acid a maleic anhydride water vapor mixture suitable for fractional condensation and recovery of maleic anhydride, which comprises gradually feeding maleic acid into a substantially constant volume of an inert diluent liquid comprising not less than about 90% molten maleic anhydride, maintained at a pressure not substantially above atmospheric pressure and at a temperature between 100° C. and the boiling point of maleic anhydride at the prevailing pressure, and correlating the temperature and pressure so that water escapes as vapor at substantially the same rate as it is fed in the form of acid and maintaining throughout substantially the entire conversion a concentration of maleic acid in the diluent liquid not above 10%.

9. The method of preparing from maleic acid a maleic anhydride water vapor mixture suitable for fractional condensation and recovery of maleic anhydride, which comprises gradually feeding maleic acid into an inert diluent liquid comprising not less than about 90% molten maleic anhydride, maintained at a temperature between 185° and 195° C. and at substantially atmospheric pressure so that water and maleic anhydride escape as vapors at substantially the same rate they are fed in the form of acid, and maintaining throughout substantially the entire conversion a concentration of maleic acid in the diluent liquid not above 10%.

10. The method of preparing from maleic acid a maleic anhydride water vapor mixture suitable for fractional condensation and recovery of maleic anhydride, which comprises gradually feeding maleic acid into molten phthalic anhydride maintained at a temperature between 200° and 280° C. and at substantially atmospheric pressure so that water and maleic anhydride escape as vapors at substantially the same rate as the maleic acid is fed into the phthalic anhydride, and maintaining throughout substantially the entire conversion a concentration of maleic acid in the molten phthalic anhydride not above 10%.

FRANK PORTER.